(12) United States Patent
Arnault et al.

(10) Patent No.: US 11,536,351 B2
(45) Date of Patent: Dec. 27, 2022

(54) PULLEY DEVICE, IN PARTICULAR FOR TENSIONING IDLER OR RUNNER ROLLER

(71) Applicant: AKTIEBOLAGET SKF, Gothenburg (SE)

(72) Inventors: Benoit Arnault, Saint-Cyr-sur-Loire (FR); Mickael Chollet, Toué-lès-Tours (FR); Kévin Lefort, Donges (FR); Simon Prevost, Tours (FR)

(73) Assignee: AKTIEBOLAGET SKF, Gothenburg (SE)

( * ) Notice: Subject to any disclaimer, the term of this patent is extended or adjusted under 35 U.S.C. 154(b) by 402 days.

(21) Appl. No.: 16/752,895

(22) Filed: Jan. 27, 2020

(65) Prior Publication Data
US 2020/0263766 A1    Aug. 20, 2020

(30) Foreign Application Priority Data
Feb. 18, 2019  (DE) .......................... 102019202143.3

(51) Int. Cl.
| F16H 7/20 | (2006.01) |
| F16C 19/08 | (2006.01) |
| F16H 7/02 | (2006.01) |
| F16H 55/36 | (2006.01) |

(52) U.S. Cl.
CPC .............. *F16H 7/20* (2013.01); *F16C 19/08* (2013.01); *F16H 7/02* (2013.01); *F16H 55/36* (2013.01)

(58) Field of Classification Search
CPC . F16H 55/36; F16H 7/20; F16H 55/44; F16H 55/48; F16H 2007/0865; F16H 35/10; F16C 13/006

USPC ........................................................ 474/166
See application file for complete search history.

(56) References Cited

U.S. PATENT DOCUMENTS

| 137,270 | A | * | 3/1873 | Whipple | ................. | F16H 55/36 |
| | | | | | | 474/166 |
| 665,643 | A | * | 1/1901 | McCabe | ............... | F16C 13/006 |
| | | | | | | 384/547 |
| 747,436 | A | * | 12/1903 | Johnston | ................. | F16C 33/32 |
| | | | | | | 384/535 |
| 859,099 | A | * | 7/1907 | Nice | ....................... | F16C 55/44 |
| | | | | | | 474/182 |

(Continued)

FOREIGN PATENT DOCUMENTS

| DE | 202005011230 U1 | 9/2005 |
| GB | 190509598 A | 5/1906 |

(Continued)

*Primary Examiner* — Henry Y Liu
(74) *Attorney, Agent, or Firm* — J-Tek Law PLLC; Scott T. Wakeman; Mark A. Ussai

(57) ABSTRACT

A pulley device configured to support a belt of a chain tensioning idler or runner roller includes a bearing having a rotatable outer ring and a coaxial fixed inner ring and a pulley having at least one C-shaped pulley part that has an inner portion with an inner surface mounted on an outer cylindrical surface of the bearing outer ring, an outer cylindrical portion having an outer cylindrical surface configured to contact the belt or the chain, and a radial intermediate portion between axial outer ends of the inner and outer cylindrical portions and an axial outer end of the outer cylindrical portion, wherein a ratio between a radial material thickness of the outer cylindrical portion and a radial material thickness of the inner cylindrical portion is strictly greater than 1.

20 Claims, 2 Drawing Sheets

(56) References Cited

U.S. PATENT DOCUMENTS

| | | | |
|---|---|---|---|
| 1,482,579 A * | 2/1924 | Nice | F16C 33/60 |
| | | | 384/546 |
| 1,606,175 A | 11/1926 | Thomas | |
| 1,627,558 A * | 5/1927 | Grunwald | F16C 13/006 |
| | | | 29/524.1 |
| 2,253,327 A * | 8/1941 | Delaval-Crow | F16N 7/00 |
| | | | 184/109 |
| 2,546,782 A * | 3/1951 | Rives | F16H 55/44 |
| | | | 474/181 |
| 2,669,878 A * | 2/1954 | Nelson | F16H 55/44 |
| | | | 474/181 |
| 3,490,285 A * | 1/1970 | Donath | F16H 7/12 |
| | | | 474/187 |
| 3,633,431 A | 1/1972 | Bussel | |
| 3,771,843 A * | 11/1973 | Clasper | B21D 53/26 |
| | | | 474/197 |
| 3,789,683 A * | 2/1974 | Frost | F16H 55/44 |
| | | | 474/181 |
| 3,822,457 A * | 7/1974 | Frost | F16H 55/44 |
| | | | 219/91.21 |
| 3,842,475 A * | 10/1974 | Clasper | B21D 53/26 |
| | | | 228/113 |
| 3,915,511 A | 10/1975 | Clasper et al. | |
| 3,926,485 A | 12/1975 | Frost et al. | |
| 4,443,210 A | 4/1984 | Olschewski et al. | |
| 4,457,740 A | 7/1984 | Olschewski et al. | |
| 4,468,210 A | 8/1984 | McCutchan, Jr. | |
| 4,490,128 A * | 12/1984 | Weiss | B60B 33/0063 |
| | | | 474/166 |
| 4,518,372 A * | 5/1985 | Dye | F16C 13/006 |
| | | | 474/94 |
| 4,534,749 A * | 8/1985 | Hans | F16H 7/1254 |
| | | | 474/174 |
| 4,571,226 A | 2/1986 | Molloy et al. | |
| 4,591,352 A | 5/1986 | Olschewski et al. | |
| 4,600,400 A * | 7/1986 | Hallerback | B66D 3/08 |
| | | | 474/166 |
| 4,602,875 A | 7/1986 | Doerr et al. | |
| 4,610,646 A * | 9/1986 | Walter | F16H 7/20 |
| | | | 474/197 |
| 4,799,909 A * | 1/1989 | Kanemitsu | F16C 13/006 |
| | | | 72/82 |
| 4,822,111 A | 4/1989 | Albert | |
| 4,831,705 A * | 5/1989 | Kanemitsu | B21D 53/261 |
| | | | 72/82 |
| 5,476,423 A * | 12/1995 | Meyer | B29C 65/665 |
| | | | 474/166 |
| 5,725,448 A * | 3/1998 | Kato | F16C 13/006 |
| | | | 384/510 |
| 5,823,904 A | 10/1998 | Hodjat et al. | |
| 5,931,755 A | 8/1999 | Mailey et al. | |
| 6,010,420 A * | 1/2000 | Niki | F16C 19/166 |
| | | | 474/199 |
| 6,102,822 A * | 8/2000 | Nakazeki | F16C 33/416 |
| | | | 384/523 |
| 6,139,457 A * | 10/2000 | Kanemitsu | F16H 55/44 |
| | | | 474/170 |
| 6,196,720 B1 * | 3/2001 | Nozaki | C10M 169/02 |
| | | | 384/13 |
| 6,238,744 B1 * | 5/2001 | Magoulick | F16C 33/64 |
| | | | 427/419.7 |
| 6,241,257 B1 * | 6/2001 | Hauck | F16C 13/006 |
| | | | 384/489 |
| 6,270,001 B1 * | 8/2001 | Tadic | B23P 15/003 |
| | | | 228/256 |
| 6,293,885 B1 * | 9/2001 | Serkh | F16H 55/44 |
| | | | 474/133 |
| 7,041,020 B2 * | 5/2006 | Singer | F16C 13/006 |
| | | | 474/166 |
| 7,108,623 B2 * | 9/2006 | Cadarette | F16H 55/36 |
| | | | 474/166 |
| 7,485,059 B2 * | 2/2009 | Fadler | F16H 55/44 |
| | | | 474/166 |
| 7,569,633 B2 * | 8/2009 | Koizumi | C08L 61/06 |
| | | | 474/166 |
| 8,651,988 B2 * | 2/2014 | Kapfer | F16C 13/006 |
| | | | 474/135 |
| 9,453,571 B2 * | 9/2016 | Qin | F16H 55/44 |
| 10,088,031 B2 * | 10/2018 | Koda | F16H 55/44 |
| 10,228,051 B2 * | 3/2019 | Basile | F16H 55/36 |
| 2001/0016529 A1 * | 8/2001 | Kawachi | F16H 55/36 |
| | | | 474/94 |
| 2002/0028033 A1 * | 3/2002 | Takemura | F16H 55/36 |
| | | | 384/476 |
| 2002/0052242 A1 * | 5/2002 | Tabuchi | F16F 1/377 |
| | | | 464/87 |
| 2002/0086754 A1 * | 7/2002 | Fukuwaka | F16C 33/416 |
| | | | 474/199 |
| 2003/0008741 A1 * | 1/2003 | Fadler | F16H 55/44 |
| | | | 474/181 |
| 2003/0008743 A1 * | 1/2003 | Cadarette | F16H 55/36 |
| | | | 474/166 |
| 2004/0178398 A1 * | 9/2004 | Miller | F16H 55/44 |
| | | | 474/166 |
| 2004/0235599 A1 | 11/2004 | Ozorak et al. | |
| 2004/0264824 A1 | 12/2004 | Iwata | |
| 2006/0084541 A1 * | 4/2006 | Nosaka | F16D 3/68 |
| | | | 474/170 |
| 2006/0089201 A1 | 4/2006 | Nosaka et al. | |
| 2006/0142102 A1 * | 6/2006 | Radocaj | F16H 55/50 |
| | | | 474/170 |
| 2007/0270257 A1 * | 11/2007 | Tada | F16H 55/36 |
| | | | 474/70 |
| 2008/0287236 A1 * | 11/2008 | Yamaguchi | F16H 55/36 |
| | | | 474/170 |
| 2008/0300077 A1 * | 12/2008 | Kapfer | F16C 13/006 |
| | | | 474/133 |
| 2009/0048392 A1 * | 2/2009 | Tsuda | C08L 61/06 |
| | | | 524/566 |
| 2009/0087130 A1 * | 4/2009 | Schenk | F16C 13/006 |
| | | | 384/418 |
| 2009/0145261 A1 | 6/2009 | Obeshaw | |
| 2009/0191999 A1 * | 7/2009 | Joseph | F16H 55/36 |
| | | | 384/485 |
| 2009/0247338 A1 * | 10/2009 | Hwang | F16C 13/006 |
| | | | 474/166 |
| 2009/0298630 A1 * | 12/2009 | Mineno | F16C 35/073 |
| | | | 474/199 |
| 2011/0039648 A1 * | 2/2011 | Lannutti | F16H 7/20 |
| | | | 474/166 |
| 2011/0111900 A1 | 5/2011 | Wilson et al. | |
| 2012/0142468 A1 * | 6/2012 | Lescorail | F16C 35/067 |
| | | | 384/477 |
| 2012/0305870 A1 * | 12/2012 | Ruef | F16H 55/48 |
| | | | 254/390 |
| 2013/0331215 A1 * | 12/2013 | Hewitt | F16H 55/44 |
| | | | 474/174 |
| 2014/0031157 A1 | 1/2014 | Takano et al. | |
| 2014/0179476 A1 * | 6/2014 | Qin | F16H 55/44 |
| | | | 474/166 |
| 2015/0184736 A1 * | 7/2015 | Cha | F16H 55/36 |
| | | | 474/166 |
| 2015/0252885 A1 * | 9/2015 | Manzoor | F16F 7/12 |
| | | | 474/166 |
| 2015/0292603 A1 * | 10/2015 | Cherioux | F16C 35/073 |
| | | | 474/166 |
| 2015/0300463 A1 * | 10/2015 | Albrecht | F16C 33/586 |
| | | | 474/166 |
| 2016/0017978 A1 * | 1/2016 | Koda | F16H 55/44 |
| | | | 474/166 |
| 2016/0053876 A1 * | 2/2016 | Nakamura | F16H 35/10 |
| | | | 474/166 |
| 2016/0160988 A1 * | 6/2016 | Quincay | F16H 55/36 |
| | | | 474/166 |
| 2016/0245389 A1 | 8/2016 | Albrecht et al. | |
| 2017/0023119 A1 | 1/2017 | Lannutti et al. | |
| 2017/0037953 A1 * | 2/2017 | Liege | F16H 55/36 |

(56) References Cited

U.S. PATENT DOCUMENTS

| | | | |
|---|---|---|---|
| 2017/0292599 A1* | 10/2017 | Basile | F16C 35/067 |
| 2018/0023679 A1* | 1/2018 | Basile | F16H 55/566 |
| | | | 474/166 |
| 2018/0141104 A1* | 5/2018 | Pan | B21D 53/261 |
| 2018/0223982 A1* | 8/2018 | Nakao | F16C 33/586 |
| 2019/0186612 A1 | 6/2019 | Arnault et al. | |
| 2019/0323594 A1 | 10/2019 | Arnault et al. | |
| 2019/0390756 A1 | 12/2019 | Arnault et al. | |
| 2020/0088274 A1 | 3/2020 | Arnault et al. | |
| 2020/0200221 A1* | 6/2020 | Inoue | F16C 33/7853 |
| 2020/0256378 A1 | 8/2020 | Hauvespre et al. | |
| 2020/0256447 A1 | 8/2020 | Arnault et al. | |
| 2020/0256448 A1 | 8/2020 | Chollet et al. | |
| 2020/0256449 A1 | 8/2020 | Hauvespre et al. | |
| 2020/0263766 A1 | 8/2020 | Arnault et al. | |
| 2020/0263776 A1 | 8/2020 | Arnault et al. | |
| 2020/0386304 A1 | 12/2020 | Arnault et al. | |
| 2020/0393032 A1 | 12/2020 | Kerin et al. | |

FOREIGN PATENT DOCUMENTS

| | | |
|---|---|---|
| GB | 141829 A | 4/1920 |
| WO | 2006092187 A1 | 9/2006 |
| WO | 2007101771 A1 | 9/2007 |
| WO | 2011098125 A1 | 8/2011 |

* cited by examiner

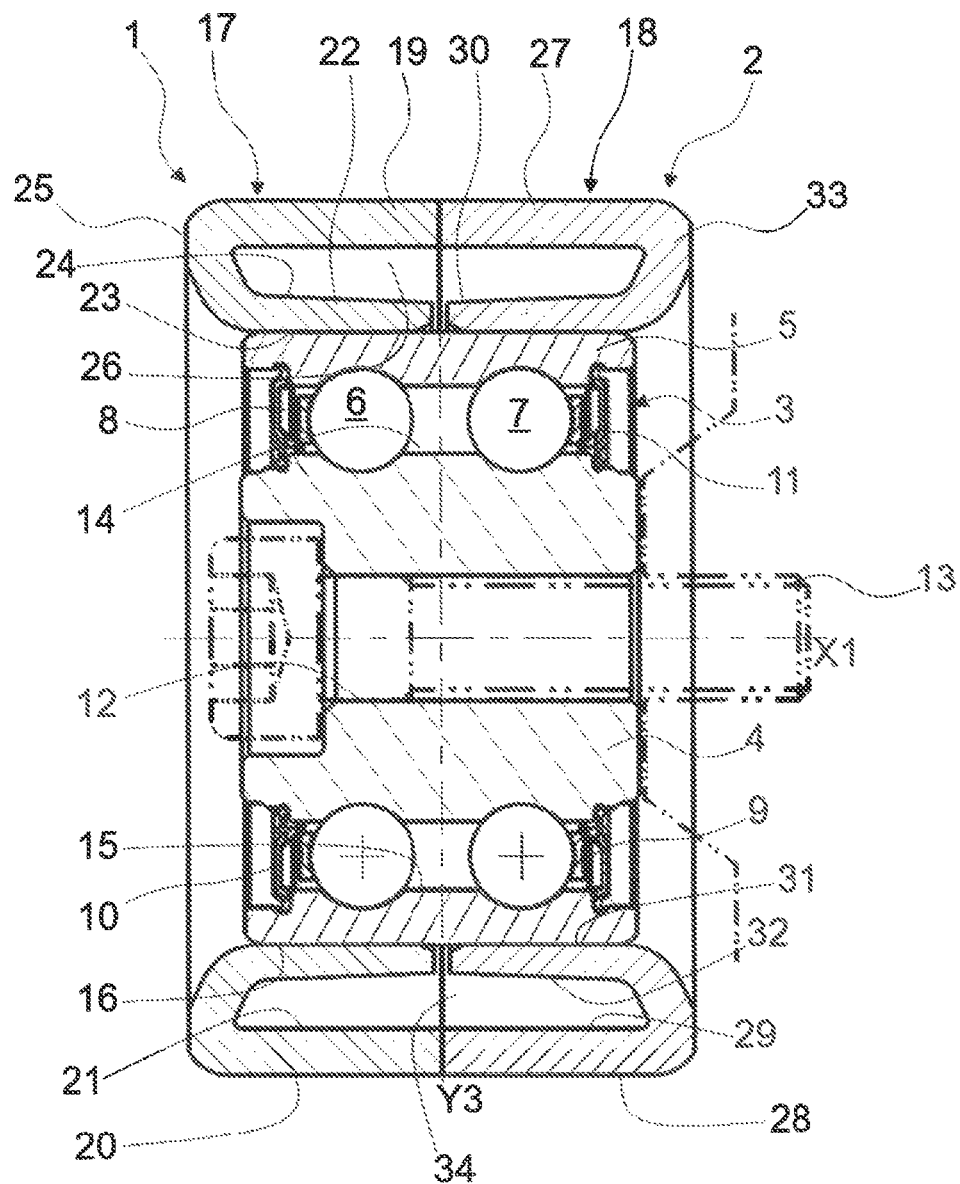

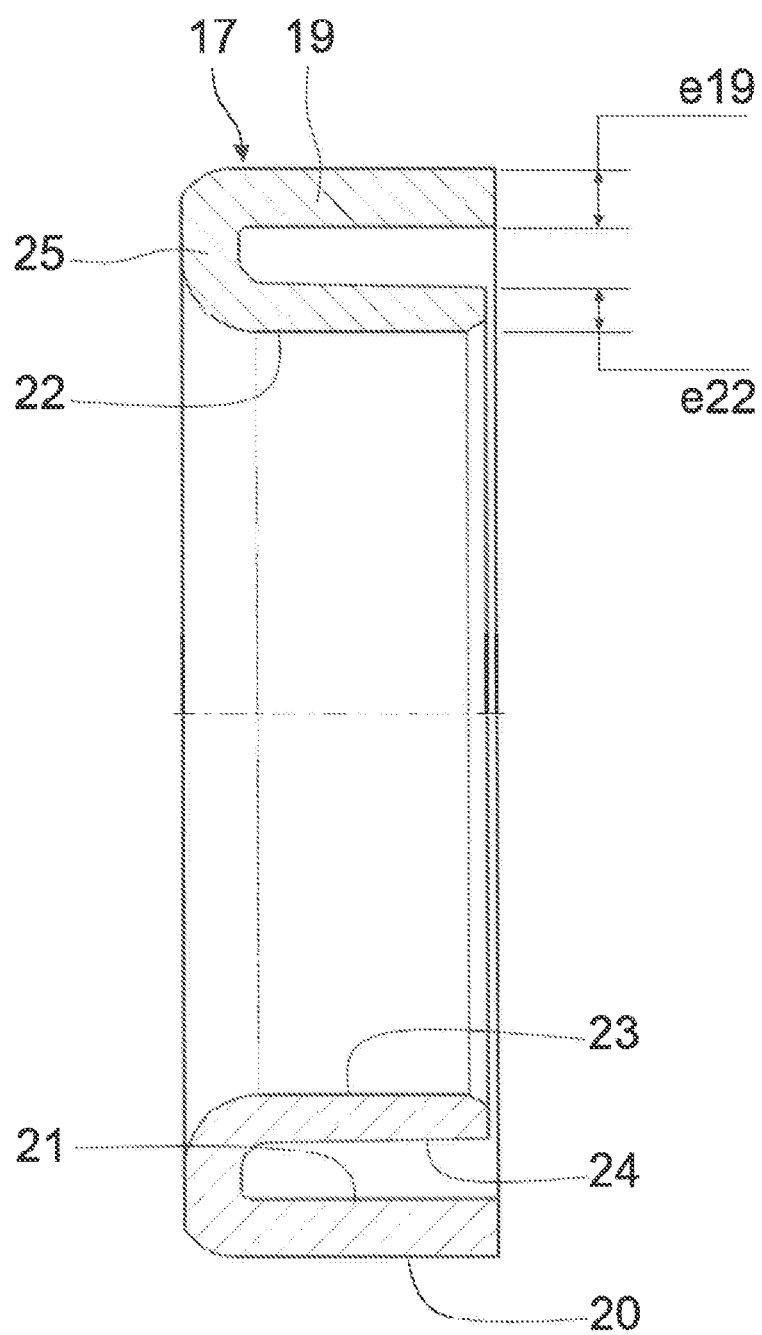

PULLEY DEVICE, IN PARTICULAR FOR TENSIONING IDLER OR RUNNER ROLLER

CROSS-REFERENCE

This application claims priority to German patent application no. 10 2019 202 143.3 filed on Feb. 18, 2019, the contents of which are fully incorporated herein by reference.

TECHNICAL FIELD

The present disclosure is directed to the field of pulley devices for tensioning idlers or runner rollers designed to interact with a chain or a belt, for example a distribution belt of an internal combustion engine of a vehicle.

BACKGROUND

Such rollers are usually used to keep a tension on the belt or chain constant or in a determined range or to locally modify the path taken by the chain or belt. These are called respectively tensioning idlers or runner rollers. In runner rollers, the pulley is mounted so as to rotate on a screw or a spindle by means of a rolling bearing, the roller then being attached directly or indirectly to the engine block or to an element of a tensioning idler device, for example an articulated arm or an eccentric.

Document GB 190509598 discloses a pulley comprising male and female overlapping parts which are in interlocking relation and form a cylindrical outer portion intended to be in contact with a belt.

A major disadvantage of this pulley is that an annular recess is formed on the outer portion adapted to support the belt when the male and female parts are fastened together. There is therefore a risk of an early wear of the belt.

It is also known by document GB 141 829 a pulley comprising a peripheral part intended to be in contact with a belt, an inner part and a intermediate part between the inner and outer parts. The pulley is tightened to the outer ring of bearing, but said pulley can slightly axially move during the service use of the pulley device. Moreover, with a pulley such as disclosed, the outer part may be deformed radially inwards by bending under the action of the belt.

It has been proposed in document DE 202005011230 U1 to house a damping element such as a damping ring within a C-shaped pulley, said damping element being dedicated to damp vibrations from the belt and being suitable to limit radial inward deformation of outer portion of said pulley. However, the pulley can still be deformed under heavy loads.

SUMMARY

An aspect of the disclosure is to overcome these drawbacks by providing a pulley which is easy to install onto a bearing, of good rigidity, adapted to avoid an early wear of the belt, and permitting an efficient support of said belt.

To this end, the disclosure relates to a pulley device suitable for a belt of chain tensioning idler or runner roller, comprising a bearing and a pulley.

The bearing comprises a rotatable outer ring and a fixed inner ring, said rings being coaxial.

The pulley comprises at least one pulley part having in cross section an overall shape of a C, and having an inner portion with an inner surface mounted on an outer cylindrical surface of outer ring of bearing, an outer cylindrical portion having an outer cylindrical surface intended to be in contact with the belt or the chain, and a radial intermediate portion extending substantially radially between axial ends of inner and outer portions on one axial side of pulley device, the pulley part being formed integral and defining an open end on one axial side opposite to the intermediate portion.

According to the disclosure, the ratio between the material thickness (radial thickness) of the outer cylindrical portion and the material thickness of inner portion of said pulley part is strictly greater than 1. In other words, the ratio of the material thickness of any part of the outer cylindrical portion to any part of the inner cylindrical portion is always greater than 1.

According to further aspects of the disclosure which are advantageous but not compulsory, such a pulley device may incorporate one or several of the following features:

- The bearing is a rolling bearing, at least one row of rolling elements being radially interposed between the inner ring and the outer ring.
- The rolling elements are balls.
- The rolling elements are equally circumferentially spaced and maintained by an annular cage.
- The pulley is formed by only one pulley part.
- The pulley comprises two C-shaped pulley parts mounted onto the outer cylindrical surface of outer ring of bearing, open ends of said pulley parts axially facing each other, free ends of outer portions of pulley parts being in axial abutment.
- The two pulley parts are symmetrical with respect to a transverse radial plane passing through the center of the bearing.
- The outer portion of pulley part is of greater axial length than that of the inner portion, said outer portion protruding axially on at least one axial side of the inner portion.
- The pulley part is made from a stamped metal sheet or blank.
- The ratio between the material thickness of outer cylindrical portion and the material thickness of inner portion of said pulley part is between 1.1 and 1.5, and advantageously equal to 1.25.
- The outer cylindrical portion and the intermediate portion of the pulley part are of equal thickness.

BRIEF DESCRIPTION OF THE DRAWINGS

The disclosure will now be explained in correspondence with the annexed figures, as illustrative example, without restricting the invention. In the annexed figures:

FIG. 1 is an axial section of a pulley device according to a first embodiment of the invention; and FIG. 2 is an axial section of one pulley part provided to the pulley device of FIG. 1.

DETAILED DESCRIPTION

The pulley device 1 as illustrated in FIGS. 1 to 3 is suitable for a belt or chain tensioning idler or runner roller, and comprises a pulley 2 adapted to interact with a belt or chain (not shown) and a rolling bearing 3 with a geometric axis X1.

The rolling bearing comprises a fixed inner ring 4 and a rotatable outer ring 5 between which are housed two rows of rolling elements 6 and 7, which in this case are balls, two annular cages 8, 9 respectively maintaining the circumferential spacing of said rolling elements 6, 7, and two annular seals 10, 11.

The inner ring 4 and the outer ring 5 are concentric and symmetric with respect to a transverse radial plane Y3 passing through the center of the rolling bearing 3. The rings 4, 5 are advantageously of solid type. A solid type is to be understood as a ring obtained by machining with removal of material, by machining, grinding, from a metal tube stock, bar stock, rough forgings and/or rolled blanks.

The inner ring 4 comprises a bore 12 configured to receive a fastening screw 13 (in dotted line) to fasten the device 1 on an external support. The inner ring further comprises an outer cylindrical surface 14 onto which toroidal circular raceways are formed, said raceways having in cross section a concave internal profile adapted to the rolling elements 6, 7.

The outer ring 5 comprises a cylindrical bore 15 onto which toroidal circular raceways are formed, said raceways having in cross section a concave internal profile adapted to receive the rolling elements 6, 7. The outer ring 5 further comprises an outer cylindrical surface 16.

The pulley 2 has two pulley parts 17, 18, both having in cross section an overall shape of a C.

The first pulley part 17 comprises an axial annular outer portion 19 providing a cylindrical outer surface 20 designed to interact with a portion of the belt of the chain, and a cylindrical inner surface or bore 21.

The first pulley part 17 also comprises an axial annular inner portion 22 providing an inner surface or bore 23 into which the outer cylindrical surface 16 of the outer ring 5 of bearing 3 is mounted, and an outer surface 24.

The outer portion 19 is of larger diameter than that of the inner portion 22, said outer portion 19 radially surrounding the inner portion 22. Advantageously, the outer portion 19 is of greater axial length than that of the inner portion 22, said outer portion 19 protruding axially on at least one axial side of the inner portion 22.

The first pulley part 17 further comprises an annular radial intermediate portion 25 extending substantially radially between axial ends of the inner and outer portions 22, 19 on a first axial side of the pulley device 1.

The first pulley part 17 then has in cross section an overall shape of a C, defining an open end 26 on one axial side of the pulley device 1. The first pulley part 17 is formed integral.

The second pulley part 18 comprises an axial annular outer portion 27 providing a cylindrical outer surface 28 designed to interact with a portion the belt of the chain, and a cylindrical inner surface or bore 29.

The second pulley part 18 also comprises an axial annular inner portion 30 providing an inner surface or bore 31 into which the outer cylindrical surface 16 of outer ring 5 of bearing 3 is mounted, and an outer surface 32.

The outer portion 27 is of larger diameter than that of the inner portion 30, said outer portion 27 radially surrounding the inner portion 30. Advantageously, the outer portion 27 is of greater axial length than that of the inner portion 30, said outer portion 27 protruding axially on at least one axial side of the inner portion 30.

The second pulley part 18 further comprises an annular radial intermediate portion 33 extending substantially radially between axial ends of inner and outer portions 30, 27 on a second axial side of pulley device 1, said second axial side being axially opposite to the first axial side.

The second pulley part 18 then has in cross section an overall shape of a C, defining an open end 34 on one axial side of the pulley device 1. The second pulley part 18 is formed integral.

Advantageously, the pulley parts 17, 18 are both made of thin metal sheet or blank by folding, cutting and stamping.

Advantageously, the two C-shaped pulley parts 17, 18 are symmetrical with each other with respect to the radial plane Y3. The free ends of the outer portions 19, 27 of the first and second pulley parts 17, 18 respectively come into contact in an axial direction, the open ends 26, 34 respectively being axially open to each other. The two outer cylindrical surfaces 20, 28 form a surface configured to interact with the belt or the chain. The pulley 2 formed by the two pulley parts 17, 18 arranged in axial contact with each other is suitable for guiding, supporting the belt of the chain with an efficient manner.

Advantageously, the inner portions 22, 30 of the pulley part 17, 18 are cylindrical, the inner surfaces 23, 31 being cylindrical. Alternatively, the inner portions may be frusto-conical, the inner surfaces being frustoconical and inclined towards the outer surface 16 of the outer ring 5. Advantageously, the inner surfaces 23, 31 of the inner portions 22, 30 are force fitted (press-fitted) onto the outer cylindrical surface 16 of the outer ring 5.

According to the disclosure, the material thickness e19 in the radial direction of the outer cylindrical portion 19 of the pulley part 17 is strictly greater than the material thickness e22 in radial direction of the inner portion 22.

Advantageously, the ratio between the thicknesses e19 and e22 is between 1.1 and 1.5, and preferably equal to 1.25.

Similarly and symmetrically, the material thickness in the radial direction of the outer cylindrical portion 27 of the pulley part 18 is strictly greater than the material thickness in the radial direction of the inner portion 30.

Advantageously, the pulley parts 17, 18 are symmetric with respect to the radial plane Y3 passing through the center of the bearing 3, and then the outer portions 19, 27 are of equal thickness e19, and the inner portions 22, 30 are also of equal thickness e22.

In the present embodiment illustrated in FIGS. 1 and 2, the intermediate portions 25, 33 of the pulley parts 17, 18 are of equal thickness with the outer cylindrical portions 19, 27, respectively.

Because of this configuration, the outer portions 19, 27 are stiffened and then less subject to be deformed when a pulley or a chain exerts a radial load. The pulley parts 17, 18 are then more robust.

Representative, non-limiting examples of the present invention were described above in details with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved pulley device.

Moreover, various features of the above-described representative examples, as well as the various independent and dependent claims below, may be combined in ways that are not specifically and explicitly enumerated in order to provide additional useful embodiments of the present teachings.

What is claimed is:

1. A pulley device configured to support a belt of a chain tensioning idler or runner roller, comprising:
   a bearing having a rotatable outer ring and a coaxial fixed inner ring; and
   a pulley having at least one C-shaped pulley part, the at least one pulley part having an inner portion with an inner surface mounted on an outer cylindrical surface of the bearing outer ring, an outer cylindrical portion having an outer cylindrical surface configured to contact the belt or the chain, and a radial intermediate portion extending substantially radially between an axial outer end of the inner cylindrical portion and an axial outer end of the outer cylindrical portion, each of the at least one pulley part being formed integral and defining an open end on an axial side opposite the intermediate portion;

wherein the entire outer cylindrical portion is thicker than every part of the inner cylindrical portion.

2. The pulley device according to claim 1, wherein the at least one pulley part comprises no more than one pulley part.

3. The pulley device according to claim 1, wherein the at least one pulley part comprises two C-shaped pulley parts mounted on the outer cylindrical surface of the outer ring of bearing with the open ends of the two pulley parts axially facing each other, axially inner ends of the inner cylindrical portions being in axial abutment.

4. The pulley device according to claim 3, wherein the two pulley parts are symmetrical with respect to a transverse radial plane passing through the center of the bearing.

5. The pulley device according to claim 1, wherein the at least one pulley part is made from a stamped metal sheet or blank.

6. The pulley device according to claim 1, wherein a ratio between a thickness of the outer cylindrical portion and a thickness of the inner cylindrical portion is between 1.1 and 1.5.

7. The pulley device according to claim 6, wherein the ratio is equal to 1.25.

8. The pulley device according to claim 1, wherein a material thickness of the outer cylindrical portion is equal to a material thickness of the intermediate portion.

9. The pulley device according to claim 1,
wherein the at least one pulley part comprises two C-shaped pulley parts mounted onto the outer cylindrical surface of outer ring of bearing with the open ends of the two pulley parts axially facing each other, axially inner ends of the inner cylindrical portions being in axial abutment,
wherein the two pulley parts are symmetrical with respect to a transverse radial plane passing through the center of the bearing,
wherein the at least one pulley part is made from a stamped metal sheet or blank,
wherein a ratio between a thickness of the outer cylindrical portion and a thickness of the inner cylindrical portion is between 1.1 and 1.5, and
wherein a material thickness of the outer cylindrical portion is equal to a material thickness of the intermediate portion.

10. The pulley device according to claim 9, wherein ratio is 1.25.

11. A pulley device configured to support a belt of a chain tensioning idler or runner roller, comprising:
a bearing having a rotatable outer ring and a coaxial fixed inner ring; and
a pulley having at least one C-shaped pulley part, the at least one pulley part having an inner portion with an inner surface mounted on an outer cylindrical surface of the bearing outer ring, an outer cylindrical portion having an outer cylindrical surface configured to contact the belt or the chain, and a radial intermediate portion extending substantially radially between an axial outer end of the inner cylindrical portion and an axial outer end of the outer cylindrical portion, each of the at least one pulley part being formed integral and defining an open end on an axial side opposite the intermediate portion;
wherein a ratio between a material thickness of the outer cylindrical portion at a first location radially outward of the outer ring and a material thickness of the inner cylindrical portion at a second location radially between the first location and the outer ring is strictly greater than 1.

12. The pulley device according to claim 11, wherein the at least one pulley part comprises no more than one pulley part.

13. The pulley device according to claim 11, wherein the at least one pulley part comprises two C-shaped pulley parts mounted on the outer cylindrical surface of the outer ring of bearing with the open ends of the two pulley parts axially facing each other, axially inner ends of the inner cylindrical portions being in axial abutment.

14. The pulley device according to claim 13, wherein the two pulley parts are symmetrical with respect to a transverse radial plane passing through the center of the bearing.

15. The pulley device according to claim 11, wherein the at least one pulley part is made from a stamped metal sheet or blank.

16. The pulley device according to claim 11, wherein the ratio is between 1.1 and 1.5.

17. The pulley device according to claim 11, wherein the ratio is equal to 1.25.

18. The pulley device according to claim 11, wherein the material thickness of the outer cylindrical portion is equal to a material thickness of the intermediate portion.

19. The pulley device according to claim 11,
wherein the at least one pulley part comprises two C-shaped pulley parts mounted onto the outer cylindrical surface of outer ring of bearing with the open ends of the two pulley parts axially facing each other, axially inner ends of the inner cylindrical portions being in axial abutment,
wherein the two pulley parts are symmetrical with respect to a transverse radial plane passing through the center of the bearing,
wherein the at least one pulley part is made from a stamped metal sheet or blank,
wherein the ratio is between 1.1 and 1.5, and
wherein the material thickness of the outer cylindrical portion is equal to a material thickness of the intermediate portion.

20. The pulley device according to claim 19, wherein the ratio is 1.25.

* * * * *